(12) United States Patent
Herrmann et al.

(10) Patent No.: US 11,862,374 B2
(45) Date of Patent: Jan. 2, 2024

(54) CURRENT-COMPENSATED INDUCTOR, FILTER, HIGH-VOLTAGE ON-BOARD ELECTRICAL SYSTEM AND MOTOR VEHICLE

(71) Applicant: Bayerische Motoren Werke Aktiengesellschaft, Munich (DE)

(72) Inventors: Hubert Herrmann, Haimhausen (DE); Christoph Mehrwald, Landshut (DE); Jan Sousek, Putzbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 793 days.

(21) Appl. No.: 16/968,028

(22) PCT Filed: Aug. 27, 2019

(86) PCT No.: PCT/EP2019/072852
§ 371 (c)(1),
(2) Date: Aug. 6, 2020

(87) PCT Pub. No.: WO2020/052971
PCT Pub. Date: Mar. 19, 2020

(65) Prior Publication Data
US 2021/0366642 A1 Nov. 25, 2021

(30) Foreign Application Priority Data
Sep. 13, 2018 (DE) .................. 10 2018 215 576.3

(51) Int. Cl.
*H01F 17/06* (2006.01)
*B60R 16/023* (2006.01)

(52) U.S. Cl.
CPC ........... *H01F 17/06* (2013.01); *B60R 16/023* (2013.01); *H01F 2017/065* (2013.01)

(58) Field of Classification Search
CPC .. H01F 17/06; H01F 2017/065; B60R 16/023
(Continued)

(56) References Cited

U.S. PATENT DOCUMENTS

| 3,031,736 A | 5/1962 | Madden |
| 4,287,545 A | 9/1981 | Mayer |

(Continued)

FOREIGN PATENT DOCUMENTS

| DE | 29 23 096 A1 | 12/1979 |
| DE | 20 2016 104 469 U1 | 10/2016 |
| DE | 10 2017 108 383 A1 | 2/2018 |

OTHER PUBLICATIONS

International Search Report (PCT/ISA/210) issued in PCT Application No. PCT/EP2019/072852 dated Nov. 6, 2019 with English translation (five (5) pages).

(Continued)

*Primary Examiner* — Daniel Kessie
*Assistant Examiner* — Dru M Parries
(74) *Attorney, Agent, or Firm* — Crowell & Moring LLP

(57) ABSTRACT

A current-compensated inductor for filtering interference signals which are transmitted between two high-voltage components of a high-voltage on-board electrical system of a motor vehicle, includes a toroidal, in particular circular ring-shaped or oval ring-shaped, magnet core which surrounds an inner opening, and has at least two busbars for electrically connecting the two high-voltage components. The busbars are routed axially through the inner opening of the magnet core and are arranged at a distance from one another in the inner opening so as to form an air gap. An inner side of the magnet core, which inner side faces the inner opening, and regions of outer sides of the busbars, which regions face the inner side of the magnet core, have shapes which correspond to one another.

5 Claims, 2 Drawing Sheets

(58) Field of Classification Search
USPC .......................................................... 307/10.1
See application file for complete search history.

(56) References Cited

U.S. PATENT DOCUMENTS

| | | |
|---|---|---|
| 10,102,962 B1 * | 10/2018 | Cappabianca .......... H01F 17/06 |
| 2010/0097169 A1 | 4/2010 | Earle |
| 2012/0014042 A1 | 1/2012 | Tallam et al. |
| 2013/0278368 A1 | 10/2013 | Tirilly et al. |
| 2018/0049314 A1 | 2/2018 | Amaducci et al. |
| 2018/0090257 A1 | 3/2018 | Ishihara et al. |

OTHER PUBLICATIONS

German-language Written Opinion (PCT/ISA/237) issued in PCT Application No. PCT/EP2019/072852 dated Nov. 6, 2019 (12 pages).

German-language Office Action issued in German Application No. 10 2018 215 576.3 dated Aug. 2, 2019 with partial English translation (12 pages).

* cited by examiner

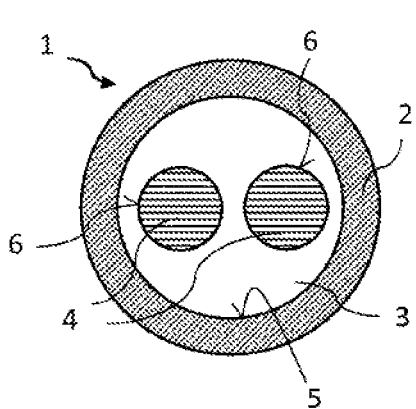
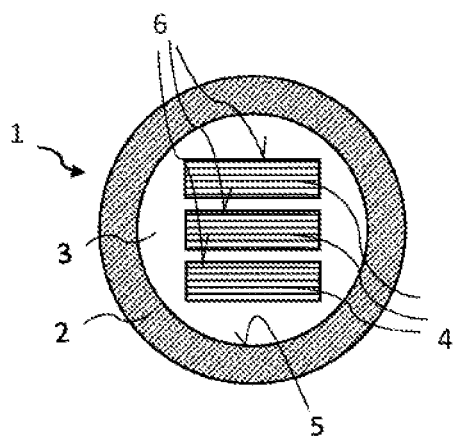
Fig. 1a  Fig. 1b
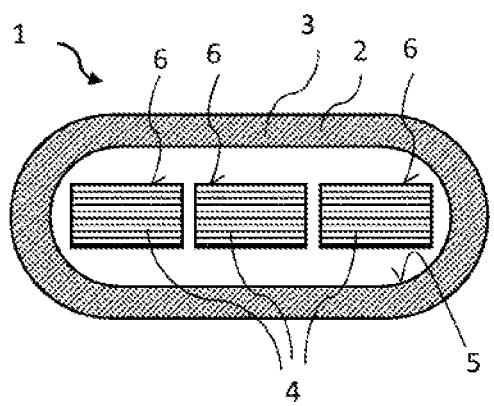
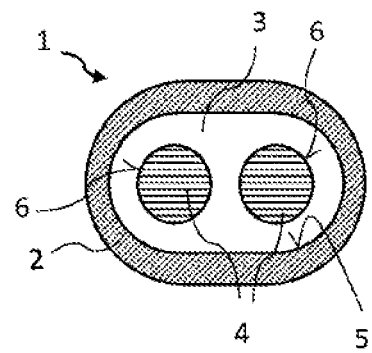
Fig. 1c  Fig. 1d
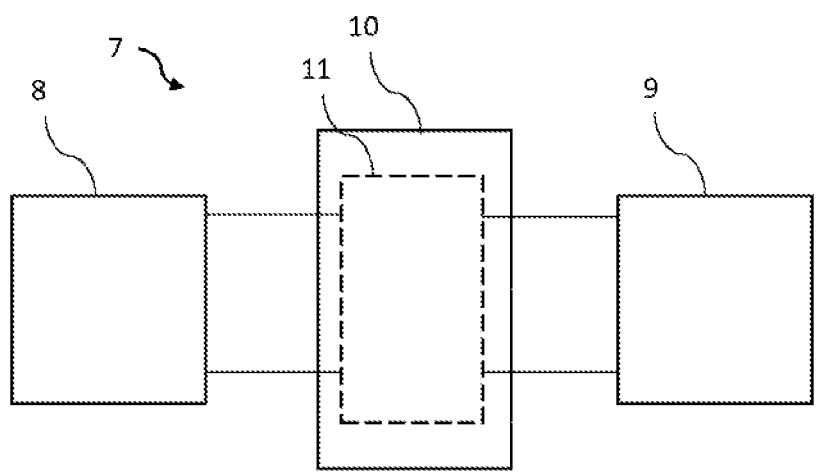
Fig. 2

CURRENT-COMPENSATED INDUCTOR, FILTER, HIGH-VOLTAGE ON-BOARD ELECTRICAL SYSTEM AND MOTOR VEHICLE

BACKGROUND AND SUMMARY OF THE INVENTION

The invention relates to a current-compensated inductor for filtering interference signals transmitted between two high-voltage components of a high-voltage on-board power system of a motor vehicle, having a toroidal magnetic core which surrounds an inner opening, and having at least two busbars for electrically connecting the two high-voltage components, wherein the busbars are guided axially through the inner opening in the magnetic core and are arranged spaced apart from one another in the inner opening while forming an airgap. The invention also relates to a filter, to a high-voltage on-board power system and to a motor vehicle.

The focus here is on an EMC (electromagnetic compatibility) filter for high-voltage on-board power systems of motor vehicles which can be driven electrically, for example in electric vehicles or hybrid vehicles. Such filters can comprise, for example, current-compensated inductors or common mode chokes (CMCs) which can be used to damp interference signals which are transmitted between two high-voltage components of the high-voltage on-board power system. Such current-compensated inductors can have, for example, a toroidal magnetic core, in particular an annular core, which is plugged onto busbars in order to electrically connect the high-voltage components.

FIG. 1a to FIG. 1d respectively shows cross sections through current-compensated inductors 1 according to the prior art. The inductor 1 according to FIG. 1a and FIG. 1b has a magnetic core 2 with a circular-ring-shaped cross section, and the inductor 1 according to FIG. 1c and FIG. 1d has a magnetic core 2 with an oval-ring-shaped cross section. Busbars 4 are arranged in an inner opening 3, extending in the axial direction (into the plane of the drawing), of the magnetic core 2, wherein the busbars 4 according to FIG. 1a and FIG. 1d each have a circular cross section, and the busbars 4 according to FIG. 1b and FIG. 1c each have a rectangular cross section.

As a result of the rectangular or circular cross sections of the busbars 4, a utilization factor of a volume of the inner opening 3, that is to say an internal volume, is not optimum. In particular, large distances are produced between an inner side 5, facing the inner opening 3, of the magnetic core 2 and areas of outer sides 6 of the busbars 4 which face the inner side 5 of the magnetic core 2. This results in comparatively low inductance of the inductor 1, which can be increased by extending the depth of the magnetic core in the axial direction. However, this involves increased material expenditure and is therefore associated with increased costs, an increased demand in terms of installation space and increased weight.

An object of the present invention is to provide a cost-effective current-compensated inductor which is economical in terms of material, installation space and weight, for a high-voltage on-board power system of a motor vehicle which can be driven electrically.

This object is achieved according to the invention by means of a current-compensated inductor, a filter, a high-voltage on-board power system and a motor vehicle having the features according to the respective independent patent claims. Advantageous embodiments of the invention are the subject matter of the dependent patent claims, of the description and of the figures.

A current-compensated inductor according to the invention serves to filter interference signals transmitted between two high-voltage components of a high-voltage on-board power system. The inductor has a toroidal magnetic core which encloses an inner opening, and at least two busbars for electrically connecting the two high-voltage components. The at least two busbars are guided axially through the inner opening in the magnetic core, and are arranged spaced apart from one another, while forming an airgap. Furthermore, an inner side of the magnetic core facing the inner opening, and areas of outer sides of the busbars facing the inner side of the magnetic core have shapes which correspond to one another.

The current-compensated inductor can be arranged, for example, in a current-transmission path between two high-voltage components in the form of a traction battery and an inverter or in the form of an inverter and an electric drive machine. The inductor is configured at least to damp interference signals which are transmitted via the current transmission path. For this purpose, the two high-voltage components are at least indirectly connected to one another electrically via the busbars of the inductor, wherein the inductor has a number of busbars which correspond to a number of phases of the current transmission path.

The toroidal magnetic core or annular core is plugged onto the busbars so that the busbars are surrounded by the magnetic core along an axial section. A toroidal magnetic core is to be understood as meaning, in particular, a circular-ring magnetic core or an oval ring magnetic core. At least a first area of the outer side of a busbar faces the inner side of the magnetic core here, and at least a second area of the outer side of a busbar faces the airgap and therefore an adjacent busbar. The airgap serves to electrically insulate the busbars from one another and can for example also be filled at least in certain areas with an electrically insulating material. The busbars are then shaped in such a way that the first areas of the outer sides which face the magnetic core correspond to a profile of the inner side of the magnetic core. Considered in cross section, a linear shape of an outer circumferential section of the busbar cross section therefore follows a linear shape of an inner circumference of the magnetic core cross section. In other words, the outer circumferential section of the busbar cross section and the inner circumference of the magnetic core cross section are oriented essentially parallel to one another. The busbar cross section is therefore adapted to the shape of the magnetic core cross section or to a shape of the inner opening which is influenced by the magnetic core cross section. Therefore, the busbar cross section and the magnetic core cross section have shapes which fit one another. The outer side of the busbars which faces the magnetic core can be applied, for example, over an entire surface to the inner side of the magnetic core or can be arranged with an airgap with small dimensions, at a distance from the inner side of the magnetic core.

As a result of the cross-sectional shapes of the busbars and magnetic core which are adapted to one another, an internal volume of the magnetic core can be utilized to an optimum degree by filling the inner opening of the busbars to a maximum extent. It is therefore possible to produce an inductor whose single unused area of the inner volume is formed by the necessary airgap between the busbars. Therefore, it is possible to make available an inductor whose inductance can be set to a high value with little material expenditure, little requirement for installation space, low weight and low costs.

It proves advantageous if the inner side of the magnetic core is formed from an electrically insulating material and the areas, facing the inner side of the magnetic core, of the outer sides of the busbars are arranged bearing over an entire surface on the inner side of the magnetic core. The magnetic core can be formed, for example, from thin iron plates which are insulated from one another or from nanoparticles which are molded in plastic, wherein the inner side is embodied in an electrically insulating fashion. Therefore, the busbars can be arranged in the inner opening of the magnetic core with maximum utilization of the volume by positioning them on the inner side of the magnetic core.

The inner side of the magnetic core preferably has at least in certain sections a concave shape and the areas, facing the concavely shaped inner side of the magnetic core, of the outer sides of the busbars have a convex shape. The concavely shaped inner side of the magnetic core and the convexly shaped areas of the outer sides of the busbars have, in particular, the same radius of curvature. The inner side of the magnetic core and the areas of the outer side of the busbars can therefore be arranged, for example, bearing one on the other.

According to a first embodiment, the magnetic core has, in order to form the concavely shaped inner side, a circular-ring-shaped cross section which surrounds the inner opening in a circular shape. In this context there can be provision that the inductor has precisely two busbars which have circular-segment-shaped cross sections in order to form the convexly shaped areas of the outer side and are arranged in the inner opening while forming a strip-shaped airgap. The toroidal magnetic core is therefore embodied here as a circular annular magnetic core. The circular-segment-shaped cross section of the busbars is bounded by a circular arc and a chord. In this context, the circular arc corresponds to the first area, facing the inner side of the magnetic core, of the outer side of the busbar, which area can be applied, for example, to the inner side of the magnetic core. The chord then corresponds to the second area, facing the airgap, of the outer side of the busbar. The two circular-segment-shaped busbar cross sections which lie opposite one another and the airgap form a circle.

There can also be provision that the inductor has three busbars which, in order to form the convexly shaped areas of the outer side, have circular-sector-shaped cross sections and which are arranged in the inner opening so as to form a star-shaped airgap. The circular inner opening can therefore be divided into three circular sectors, wherein a busbar with a cross section in the shape of a circular sector or of a piece of pie is respectively arranged in each circular sector. Cross-sectional areas of the busbars are smaller here than areas of the circular sectors so that the busbars are arranged spaced apart from one another so as to form the star-shaped, Y-shaped airgap.

According to a second embodiment, in order to form the concavely shaped inner side, the magnetic core has an oval-ring-shaped cross section which surrounds the inner opening in an oval shape and has two circular-arc-shaped sections lying opposite one another and two straight element sections lying opposite one another. The toroidal magnetic core is therefore embodied here as an oval-shaped annular magnetic core or an oval annular magnetic core. The inner circumference of the magnetic core cross section therefore has an oval shape in which the circular-arc sections are connected to one another via the straight element sections. In other words, the inner circumference has an elliptical shape which is flattened or uncurved along the main axis of the ellipsis.

In this context there can be provision that the inductor has precisely two busbars which have circular-segment-shaped cross-sectional areas in order to form the convexly shaped areas of the outer side, and are arranged on the circular-arc segments of the inner side of the magnetic core, forming a strip-shaped airgap. The circular-segment-shaped cross-sectional area can also be embodied, for example, in the form of a semicircle. For example, depending on the length of the straight element sections, the busbars can have a circular-segment-shaped cross section or a cross section which is formed by a circular-segment-shaped area and a rectangular area. In the first case, the area, facing the airgap, of the outer side of a busbar is arranged at a junction between the circular-arc section and the straight element section of the inner side of the magnetic core, and in the second case the area, facing the airgap, of the outer side of a busbar is arranged in the region of the straight element piece.

There can also be provision that the inductor has three busbars which are arranged spaced apart from one another along the straight element sections, forming two strip-shaped airgaps, wherein the two outer busbars have circular-segment-shaped cross-sectional areas in order to form the convexly shaped areas of the outer side, and the inner busbar has a rectangular cross section. The two outer busbars are therefore rounded in certain areas so that they can be arranged in a precisely fitting fashion in the region of the circular-arc sections. The central inner busbar is arranged in the region of the straight element sections and has straight, non-bent areas of the outer side for arrangement on the straight element sections.

The invention also relates to a filter for a high-voltage on-board power system of a motor vehicle which can be driven electrically and which has at least one current-compensated inductor according to the invention. The filter is configured to at least damp interference signals in the signal transmission path between the high-voltage components.

In addition, the invention relates to a high-voltage on-board power system for a motor vehicle which can be driven electrically and which has at least two high-voltage components as well as a filter according to the invention, wherein the two high-voltage components are electrically connected to one another via the busbars of the inductor. The high-voltage components can be, for example, components of an electric drive unit of the motor vehicle. For example, the high-voltage components can be a traction battery, an inverter and/or a drive machine.

A motor vehicle according to the invention comprises a high-voltage on-board power system according to the invention. The motor vehicle is embodied, in particular, as an electric vehicle or hybrid vehicle.

The embodiments which are presented with respect to the current-compensated inductor according to the invention, and the advantages thereof, apply correspondingly to the filter according to the invention, to the high-voltage on-board power system according to the invention and to the motor vehicle according to the invention.

Further features of the invention can be found in the claims, the figures and the description of the figures. The features and combinations of features which are specified above in the description and the features and combinations of features which are specified below in the description of the figures and/or shown solely in the figures can be used not only in the respectively disclosed combination but also in other combinations or alone.

The invention will now be explained in more detail on the basis of a preferred exemplary embodiment and with reference to the drawings.

BRIEF DESCRIPTION OF THE DRAWINGS

FIG. 1a to FIG. 1d are schematic cross-sectional illustrations of current-compensated inductors according to the prior art.

FIG. 2 is a schematic illustration of an embodiment of a high-voltage on-board power system according to the invention.

In the figures, identical and functionally identical elements are provided with the same reference symbols.

DETAILED DESCRIPTION OF THE DRAWINGS

Figure 3A:
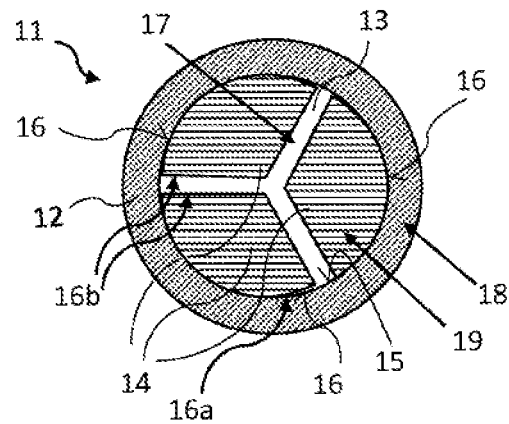
FIG. 3a to FIG. 3c are schematic cross-sectional illustrations of embodiments of current-compensated inductors according to the invention.

FIG. 2 shows a high-voltage on-board power system 7 for a motor vehicle (not shown) which can be driven electrically. The high-voltage on-board power system 7 has two high-voltage components 8, 9 which are electrically connected to one another. The high-voltage component 8 can be, for example, a traction battery of the motor vehicle which can be driven electrically, and the high-voltage component 9 can be, for example, an inverter of the motor vehicle. The high-voltage components 8, 9 are electrically coupled to one another via a filter 10 which is configured at least to damp interference signals which are transmitted between the high-voltage components 8, 9. The filter 10 has at least one current-compensated inductor 11.

Figure 3B:
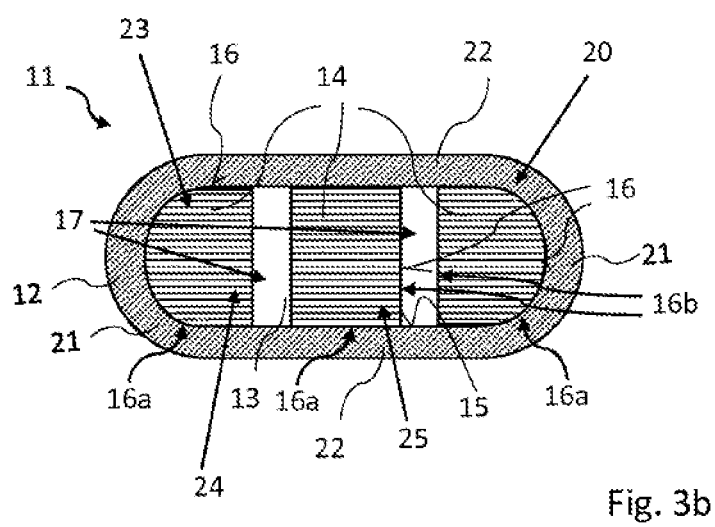
Figure 3C:
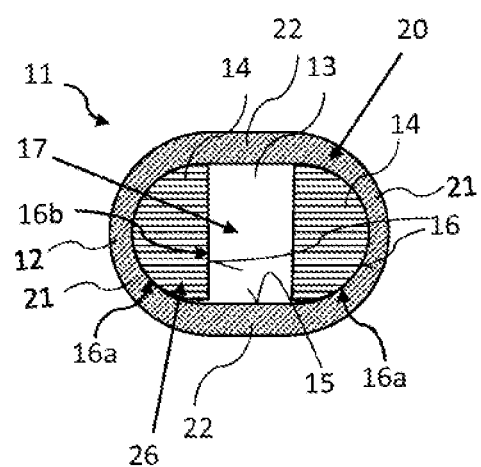

In FIG. 3a to FIG. 3c, cross-sectional illustrations of different embodiments of a current-compensated inductor 11 according to the invention are shown. The inductor 11 has a magnetic core 12 which is extruded in the axial direction (into the plane of the drawing). Busbars 14 which also extend in the axial direction are arranged within an inner opening 13 of the magnetic core 12. A section of the busbars 14 is surrounded by the magnetic core 12 here along the axial direction. The magnetic core 12 is therefore plugged onto the busbars 14. An inner side 15, facing the inner opening 13, of the magnetic core 12 and first areas 16a of outer sides 16 of the busbars 14 which face the inner side 15 of the magnetic core 12 have shapes which correspond to one another. The inner side 15 of the magnetic core 12 can be formed, for example, from an electrically insulated material so that the first areas 16a of the outer side 16 of the busbars 14 bear over an entire surface on the inner side 15 of the magnetic core 12 here.

Second areas 16b of the outer sides 16 of the busbars 14 face an airgap 17 or an electrically insulating area between the busbars 14. The inner side 15 of the magnetic core 12 is shaped concavely, at least in certain areas, here, while the first areas 16a of the busbars 14 are shaped concavely, at least in certain areas, so as to fit the latter.

In the embodiment of the inductor 11 according to FIG. 3a, the magnetic core 12 has a circular-ring-shaped cross section 18, so that the inner opening 13 is embodied in a circular fashion. Furthermore, the inductor 11 according to FIG. 3a has three busbars 14 which have circular-sector-shaped cross sections 19. The convexly shaped first areas 16a of the outer side 16 and the concavely shaped inner side 15 of the magnetic core 12 have the same radius of curvature here, so that the first areas 16a of the busbars can be positioned over an entire surface on the inner side 15 of the magnetic core 12. The three circular-sector-shaped cross sections 19 of the busbars 14 have here, in particular, areas of equal size. The airgap 17 between the circular-sector-shaped cross sections 19 of the busbars 14 is embodied in a star shape here. Given the same inductivity, a quantity of material of such an inductor 11 according to FIG. 3a is smaller, approximately by a factor of 2.5, than a quantity of material of the inductor 1 according to FIG. 1b in which the busbars 4 have rectangular cross sections. A depth of the magnetic core 2 of the inductor 1 according to FIG. 1b in the axial direction must therefore be larger approximately by a factor of 2.5 in order to set the same inductivity as the inductor 11 according to FIG. 3a.

In the embodiment of the inductor 11 according to FIG. 3b, the magnetic core 12 has an oval-ring-shaped cross section 20 with two circular-arc sections 21 lying opposite one another and two straight element sections 22 lying opposite one another. As a result, the inner opening 15 is embodied in an oval fashion. The inductor 11 according to FIG. 3b also has three busbars 14, wherein two outer busbars 14 are arranged in the region of the circular arc sections 21, and a central busbar 14 is arranged in the region of the straight element sections 22. The two outer busbars 14 each have a circular-segment-shaped cross-sectional area 23 and a rectangular cross-sectional area 24, wherein the convexly shaped form of the first area 16a of the outer side 16 of the busbar 14 is formed by the circular-segment-shaped cross-sectional area 23. The middle busbar 14 has a rectangular cross section 25. The first area 16a of the outer side 16 of the middle busbar 14 therefore has straight edges facing the straight element sections 22. A volume of the inner opening 13 is utilized here to a significantly greater extent than the internal volume of the inner opening 3 of the inductor 1 according to FIG. 1c in which the busbars 4 have rectangular cross sections.

In the embodiment of the inductor 11 according to FIG. 3c, the magnetic core 12 also has an oval-ring-shaped cross section 20, but the straight element sections 22 are shorter than the straight element sections 22 of the inductor 11 according to FIG. 3b. The inductor 11 according to FIG. 3c has two busbars 14 which have circular-segment-shaped cross sections 26 in order to form the convex shape. The circular-segment-shaped cross sections 26 are arranged spaced apart from one another here in the region of the circular-arc sections 21 of the magnetic core 12, forming a strip-shaped airgap 17.

LIST OF REFERENCE NUMBERS

1 Inductor
2 Magnetic core
3 Inner opening
4 Busbars
5 Inner side
6 Outer side
7 High-voltage on-board power system
8, 9 High-voltage components
10 Filter
11 Inductor
12 Magnetic core
13 Inner opening
14 Busbar
15 Inner side
16 Outer side 16a, 16b Areas of the outer side
17 Airgap
18 Circular-ring-shaped cross section
19 Circular-sector-shaped cross section
20 Oval-ring-shaped cross section
21 Circular-arc sections
22 Straight element sections
23 Circular-segment-shaped cross-sectional area
24 Rectangular cross-sectional area
25 Rectangular cross section
26 Circular-segment-shaped cross section

What is claimed is:

1. A current-compensated inductor for filtering interference signals transmitted between two high-voltage components of a high-voltage on-board power system of a motor vehicle, comprising:
    a toroidal magnetic core which surrounds an inner opening; and
    at least two busbars for electrically connecting the two high-voltage components, wherein
    the two busbars are guided axially through the inner opening in the magnetic core and are arranged spaced apart from one another in the inner opening while forming an airgap,
    an inner side, facing the inner opening, of the magnetic core and areas, facing the inner side of the magnetic core, of outer sides of the busbars have shapes which correspond to one another,
    the inner side of the magnetic core has at least in certain sections a concave shape,
    the areas, facing the concavely shaped inner side of the magnetic core, of the outer sides of the busbars have a convex shape in order to bear over an entire surface on the inner side of the magnetic core, wherein the concavely shaped inner side of the magnetic core and the convexly shaped areas of the outer sides of the busbars have a same radius of curvature,
    in order to form the concavely shaped inner side, the magnetic core has an oval-ring-shaped cross section which surrounds the inner opening in an oval fashion and has two circular-arc-shaped sections lying opposite one another and two straight element sections lying opposite one another,
    the inductor has three busbars which are arranged spaced apart from one another along the straight element sections, forming two strip-shaped airgaps, and
    in order to form the convexly shaped areas of the outer side, the two busbars lying on the outside have circular-segment-shaped cross-sectional areas, and the inner busbar has a rectangular-shaped cross section.

2. The current-compensated inductor according to claim 1, wherein
    the inner side of the magnetic core is formed from an electrically insulating material.

3. A filter for a high-voltage on-board power system of a motor vehicle comprising a current-compensated inductor according to claim 1.

4. A high-voltage on-board power system for a motor vehicle which is driven electrically, comprising:
    at least two high-voltage components; and
    a filter according to claim 3, wherein
    the two high-voltage components are electrically connected to one another via the busbars of the inductor.

5. A motor vehicle comprising a high-voltage on-board power system according to claim 4.

* * * * *